UNITED STATES PATENT OFFICE.

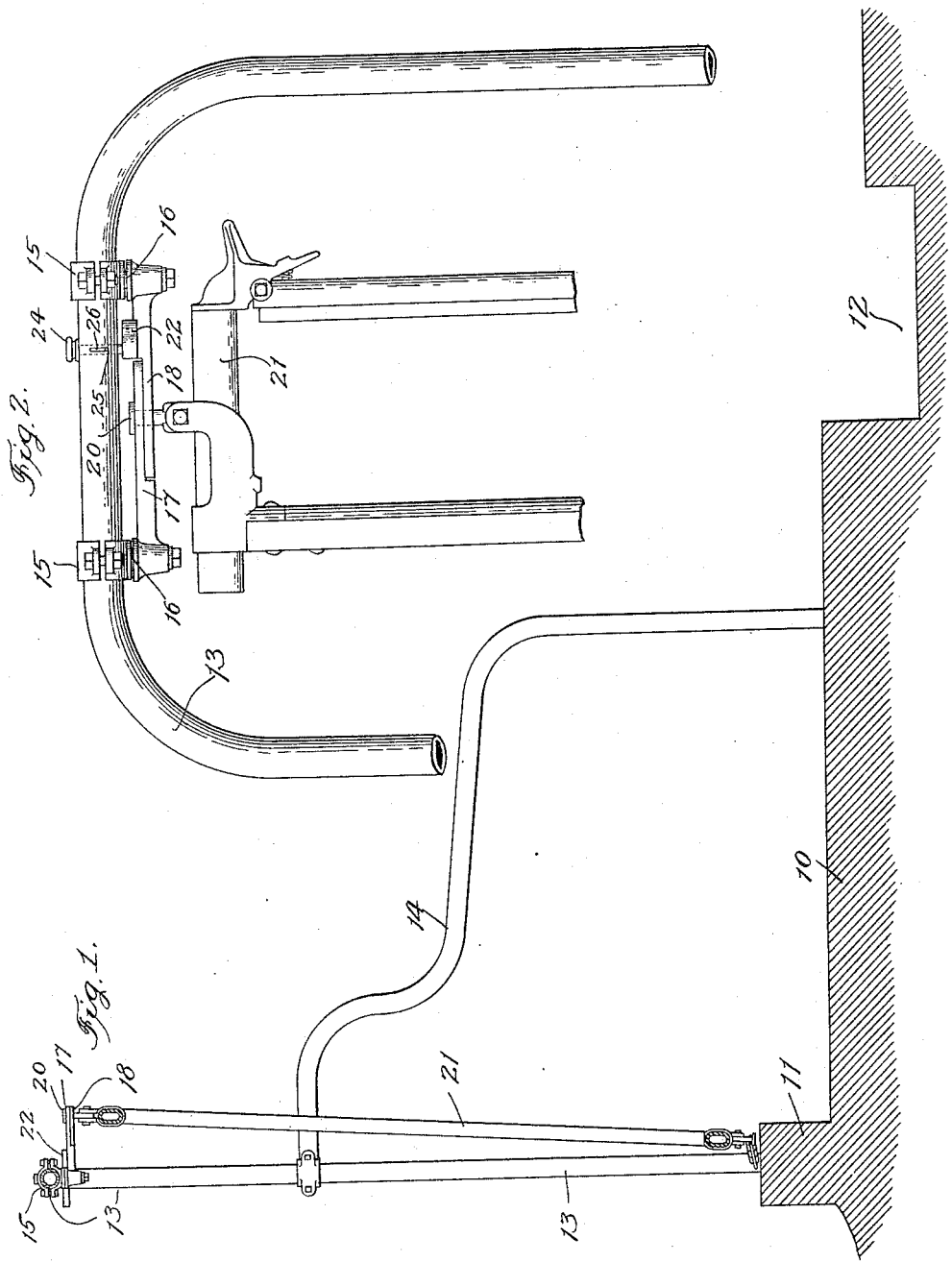

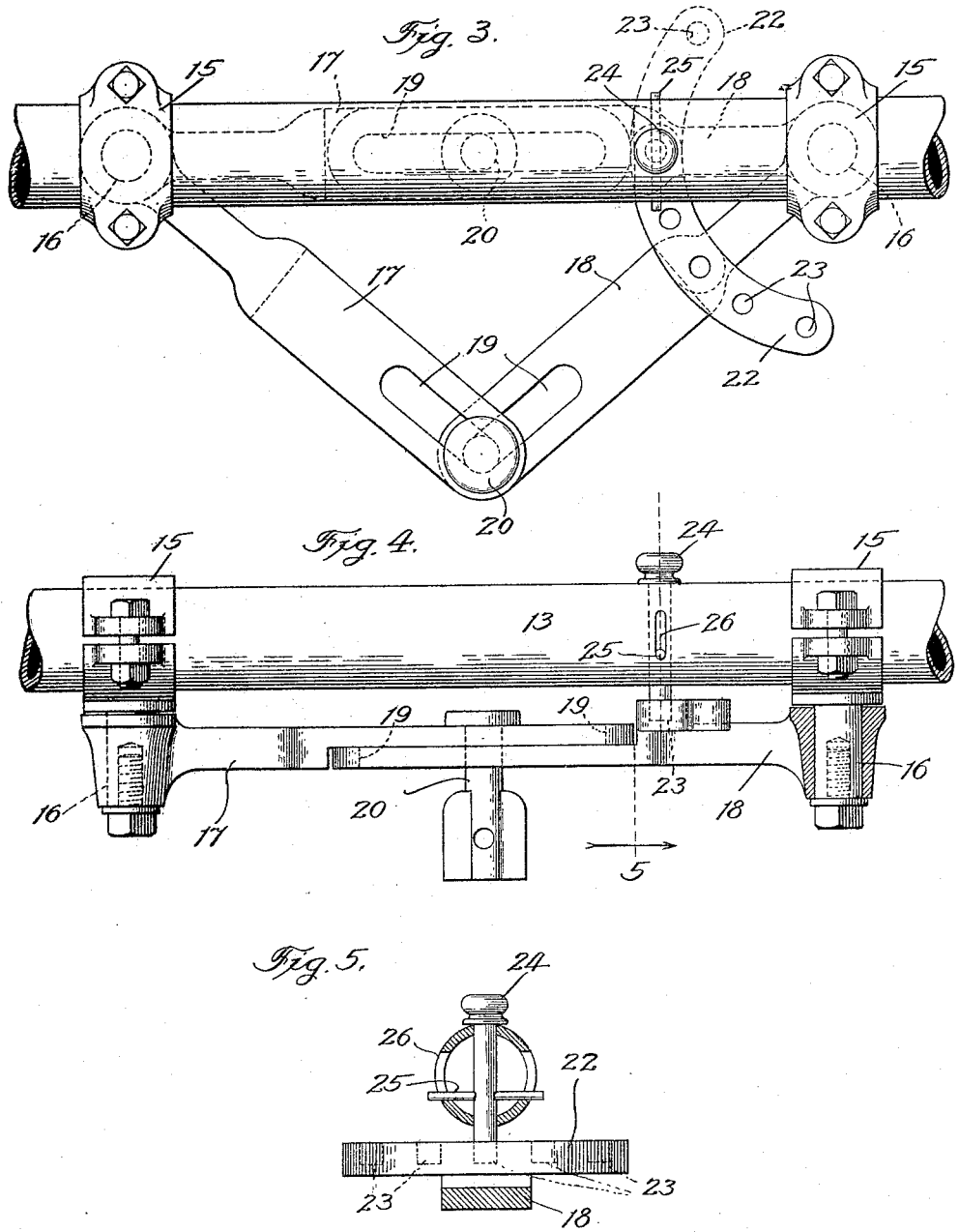

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

ANIMAL-STALL.

1,210,159.  Specification of Letters Patent.  Patented Dec. 26, 1916.

Application filed May 4, 1916. Serial No. 95,434.

*To all whom it may concern:*

Be it known that I, HENRY L. FERRIS, a citizen of the United States, residing at Harvard, in the county of McHenry and State of Illinois, have invented a new and useful Improvement in Animal-Stalls, of which the following is a specification.

My invention relates to certain improvements in animal stalls, and is particularly directed to that type of stall illustrated and described in my prior Patent No. 1,172,236, of February 15, 1916.

The invention will be more fully understood from the following detailed description of one embodiment thereof, taken in connection with the accompanying drawings, in which—

Figure 1 is a longitudinal vertical section through the central portion of a stall; Fig. 2 is an enlarged elevation of the upper end of the stall-frame, showing the manner in which the stanchion is hung therein; Fig. 3 is a top plan view of the central portion of the stall-frame, showing the means for adjusting the stanchion; Fig. 4 is an elevation of the structure shown in Fig. 3, and Fig. 5 is a section on the line 5 of Fig. 4.

Referring more particularly to the drawings. The numeral 10 designates the base or foundation of the stall which, in general, will be constructed of concrete and molded to form a curb 11 at the front of the stall and a gutter 12 at the rear thereof. The curb 11 has mounted therein the front arch 13 of the stall, which is supported by a stall partition, or longitudinal bar 14, the rear end of which is in turn mounted in the base 10.

Symmetrically arranged on the upper horizontal portion of the arch 13 there is a pair of two-piece castings 15, the lower halves of which carry pivot-studs 16, the studs 16 have mounted thereon arms 17, 18, of such length as to overlap one another when they are alined, as shown in Fig. 4, the overlapping ends being offset as therein illustrated. These ends are provided with slots 19 of equal width, and designed to receive a swivel 20 upon which the stanchion 21 is hung. The arm 18 has formed thereon a quadrant 22 having a plurality of recesses 23 in its upper face, and coöperating with these recesses there is a headed pin 24 which passes through the stall-bar 13 and is secured therein for a limited longitudinal movement by a pin 25, the ends of which work in slots 26 (Fig. 5) in the stall-bar.

The apparatus above described is particularly designed for use in relatively large installations, that is, installations capable of taking care of a relatively large herd of animals, such as dairy cows. In such use it is of importance, from a sanitary view point, to maintain the animals of the herd in proper alined position with reference to the gutter, and since, in general, the animals will be introduced indiscriminately into the stalls, it therefore becomes necessary to adjust the effective length of each stall at the time the animal is introduced thereinto.

My apparatus above described is particularly suited to such service by reason of the facility with which the stanchion 22 may be adjusted. As the animal enters the stall and the attendant locks the stanchion upon its neck, the pin 24 may be lifted out of engagement with the quadrant 22, and while the animal is held in the stanchion the latter may be pushed forwardly or rearwardly, as is necessary to properly aline the animal with the gutter, the arms 17 and 18 swinging freely upon their pivots 16, and the swivel 20 operating in the intersecting slots 19 during such movement. When the stanchion has been properly positioned, the pin 24 will be released and permitted to drop into the nearest recess 23 of the quadrant, thereby locking both of the arms 17 and 18 against further angular movement. The swinging of the arms 17 and 18 is illustrated in Fig. 3 by the dotted lines showing the arms in the central position, and by the full lines showing them in the full outward position of adjustment.

The stall adjusting means here described and illustrated is particularly advantageous in that the adjustable supports for the stanchion do not, in any position of adjustment, extend in front of the stanchion. There is therefore no part of the construction which may become caught in the horns of an animal held in the stanchion.

While I have shown and described in considerable detail one specific embodiment of my invention, this is to be regarded as illustrative only, and not as a limitation of the scope of the invention, except as such limitation is to be found in the terms of the appended claims, in which it is my intention to claim all novelty inherent in my invention as broadly as is permissible, in view of the prior art.

What I claim as new, and desire to secure by Letters Patent, is—

1. In combination, a stall provided with a gutter, a pair of arms each pivoted at its outer end to the stall, the pivots being in a line extending transversely of the stall and the arms having their inner ends overlapping, a stanchion-carrying member supported at the point of intersection of the arms, and means for locking the arms in a variety of angular positions corresponding to positions of longitudinal adjustments of the stanchion, said means being constructed to be quickly released and locked while an animal is held thereby.

2. In combination, a stall provided with a gutter, a pair of arms pivoted thereto at their outer ends and having their inner ends overlapping and provided with slots, the said pivots lying on a line transversely of the stall, a stanchion, a stanchion-carrying member held in the said slots at their point of intersection, a quadrant carried by one of said arms, and a locking member carried by the stall and adapted for engagement with said quadrant and adapted to release and lock the same quickly to permit of adjustment of the stanchion while an animal is held thereby.

HENRY L. FERRIS.

Copies of this patent may be obtained for five cents each, by addressing the "Commissioner of Patents, Washington, D. C."